Dec. 17, 1957 R. G. MILLER 2,816,774
TRAILER STEERING MECHANISM
Filed May 25, 1956 2 Sheets-Sheet 1

INVENTOR
Robert G. Miller

Dec. 17, 1957  R. G. MILLER  2,816,774
TRAILER STEERING MECHANISM
Filed May 25, 1956  2 Sheets-Sheet 2

INVENTOR
Robert G. Miller

United States Patent Office 2,816,774
Patented Dec. 17, 1957

2,816,774

TRAILER STEERING MECHANISM

Robert G. Miller, Castle Shannon, Pa., assignor to Salem-Brosius, Inc., Pittsburgh, Pa., a corporation of Pennsylvania Application May 25, 1956, Serial No. 587,329

5 Claims. (Cl. 280—103)

This invention relates to trailer steering mechanism, particularly steering mechanism for trailers having at least two pairs of separate wheel mounting structures with the pairs of such structures spaced apart generally longitudinally of the body and the wheel mounting structures of each pair spaced apart generally transversely of the body. The invention has to do with steering mechanism for such trailers which simultaneously turns the respective separate wheel mounting structures so that when the trailer is steered to move in a curved path each wheel mounting structure is disposed at substantially the optimum angle for movement in such path.

For purposes of explanation and illustration the invention will be described as embodied in steering mechanism for a trailer having four pairs of separate wheel mounting structures, two pairs adjacent each end of the body, the pairs adjacent each end of the body being spaced apart generally longitudinally of the body, the wheel mounting structures of each pair being spaced apart generally transversely of the body, and each of the wheel mounting structures being connected with the body for turning movement relatively to the body about a generally vertical axis, there being at least one wheel mounted in each of the wheel mounting structures. I may provide steering mechanism for the wheel mounting structures adjacent an end of the body, similar steering mechanism for the wheel mounting structures adjacent the opposite end of the body and connecting means connecting together those steering mechanisms to function in unison so that each of the wheel mounting structures will be turned at substantially the optimum angle for movement of the trailer along the desired path.

The invention may be employed in a trailer having two pairs of separate wheel mounting structures adjacent one end of the body and steering mechanism for controlling such wheel mounting structures without necessarily similarly controlling wheel mounting structures adjacent the opposite end of the body although for optimum results all of the wheel mounting structures of the trailer ought to be controlled by the steering mechanism.

Trailers embodying my invention can be made lower in height, shorter in length and narrower in width than trailers equipped with steering mechanisms heretofore known. It is also possible when my improved steering mechanism is employed to achieve greater swing of the tongue or drawbar than has heretofore been possible in trailers of the same general character, resulting in substantial reduction of the turning radius through which the pulling tractor must move.

I provide, in a trailer having a body, separate wheel mounting structures spaced apart generally transversely of the body, each of the wheel mounting structures being connected with the body for turning movement relatively to the body about a generally vertical axis, at least one wheel mounted in each of the wheel mounting structures and a tongue at an end of the body for moving the trailer, the tongue being pivotally connected with the body and having a portion extending beyond the pivot away from said end of the body, and a link pivoted intermediate its ends to said portion of the tongue and at its respective ends connected with the respective wheel mounting structures to turn the wheel mounting structures upon turning of the tongue. Each of the wheel mounting structures preferably has a projection extending in the same general direction as the above mentioned portion of the tongue, in which case the link which is pivoted intermediate its ends to said portion of the tongue is at its respective ends connected with the respective projections of the wheel mounting structures to turn the wheel mounting structures upon turning of the tongue.

I further provide, in a trailer having a body, two pairs of separate wheel mounting structures, the pairs being spaced apart generally longitudinally of the body, the wheel mounting structures of each pair being spaced apart generally transversely of the body, each of the wheel mounting structures being connected with the body for turning movement relatively to the body about a generally vertical axis, at least one wheel mounted in each of the wheel mounting structures and a tongue at an end of the body for moving the trailer, the tongue being pivotally connected with the body and having a portion extending beyond the pivot away from said end of the body, a link pivoted intermediate its ends to said portion of the tongue and at its respective ends connected with the wheel mounting structures of one of said pairs of wheel mounting structures and additional links, one at each side of the longitudinal center line of the trailer, connecting the two wheel mounting structures at that side, whereby turning of the tongue about its pivotal connection with the body turns all four wheel mounting structures. Preferably each of the wheel mounting structures of one of the pairs of wheel mounting structures has a projection extending in the same general direction as the above mentioned portion of the tongue in which case the link which is pivoted intermediate its ends to said portion of the tongue is connected at its respective ends with said respective projections, and the two wheel mounting structures at each side of the longitudinal center line of the trailer preferably have other projections extending generally in the same direction from their generally vertical axes, the additional links connecting the last mentioned projections. In the present preferred embodiment of the invention shown in the drawings each of the wheel mounting structures of the pair of wheel mounting structures nearer the end of the body at which the tongue is disposed has one of the first mentioned projections.

I still further provide, in a trailer having a body, four pairs of separate wheel mounting structures, two pairs adjacent each end of the body, the pairs adjacent each end of the body being spaced apart generally longitudinally of the body, the wheel mounting structures of each pair being spaced apart generally transversely of the body, each of the wheel mounting structures being connected with the body for turning movement relatively to the body about a generally vertical axis, at least one wheel mounted in each of the wheel mounting structures and tongues at the respective ends of the body for moving the trailer, each tongue being pivotally connected with the body and having a portion extending beyond the pivot away from the end of the body at which the tongue is disposed, each of the wheel mounting structures of one of the pairs of wheel mounting structures adjacent each end of the body having a projection extending in the same general direction as the aforementioned portion of the corresponding tongue, a link pivoted intermediate its ends to the aforementioned portion of each tongue and at its respective ends connected with said respective projections of said pair of wheel mounting structures adjacent the corresponding end of the body, the two wheel mounting structures at each side of the longitudinal center line of the trailer at each end of the body having other projections extending generally in the same direction from their generally vertical axes, additional links, one at each side of the longitudinal center line of the trailer adjacent each end of the body, connecting the last mentioned projections of the corresponding two wheel mounting structures and means connecting the respective tongues for operation in unison, whereby turning of either tongue about its pivotal connection with the body turns all eight wheel mounting structures. Each of the tongues preferably has a cross piece fixed thereto, and crossed links may be provided which are pivoted to the respective cross pieces so that turning of one tongue in one direction causes turning of the other tongue in the opposite direction, whereby turning of either tongue about its pivotal connection with the body turns all four wheel mounting structures adjacent one end of the body in one direction and all four wheel mounting structures adjacent the opposite end of the body in the opposite direction.

Other details, objects and advantages of the invention will become apparent as the following description of a present preferred embodiment thereof proceeds.

In the accompanying drawings I have shown a present preferred embodiment of the invention in which—

Figures 1, 2:
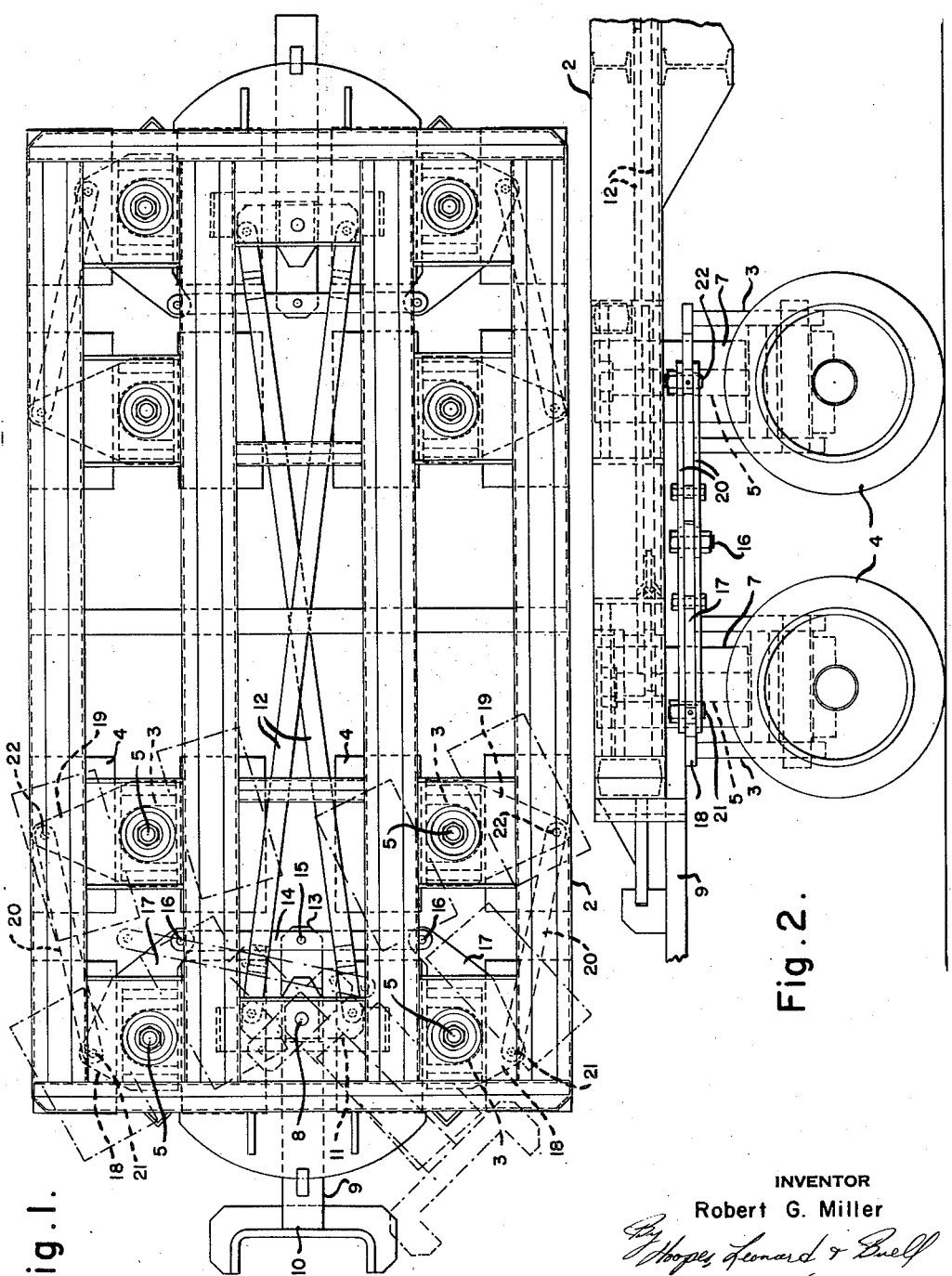
Figure 1 is a plan view of a trailer having my steering mechanism applied thereto so as to steer all of the wheel mounting structures thereof.
Figure 2 is an elevational view to enlarged scale of the structure shown in Figure 1 at one end only of the trailer.
Figure 3:
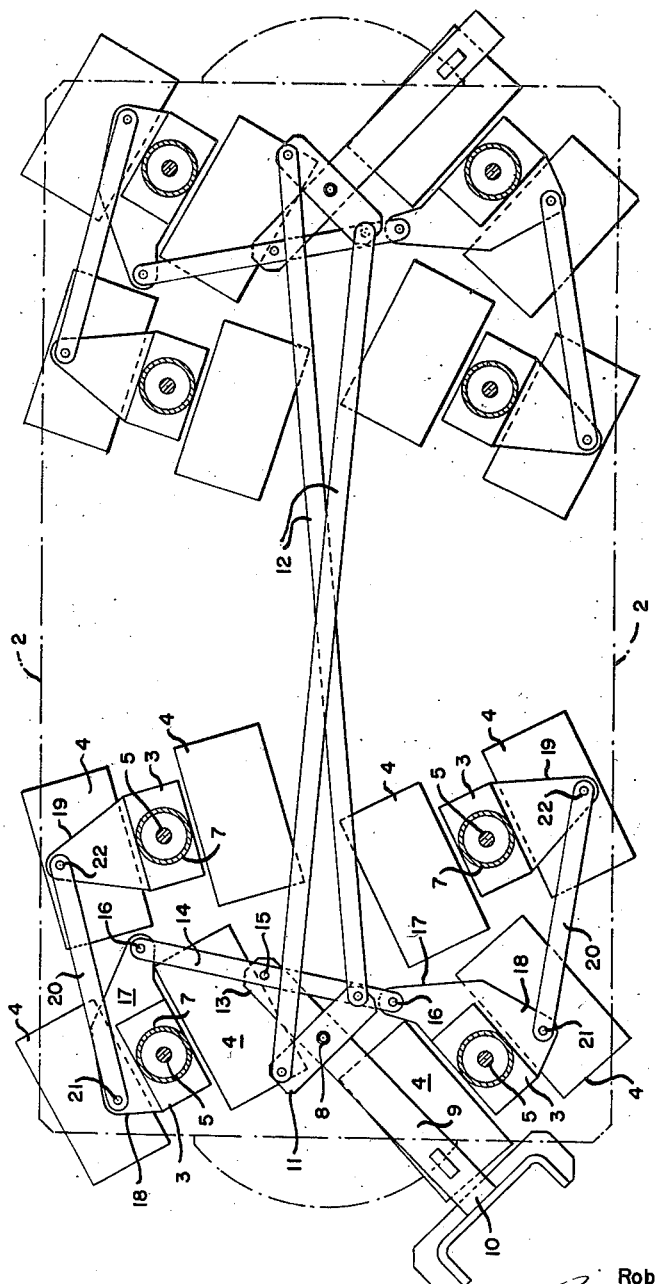
Figure 3 is a plan view of the trailer steering mechanism showing the wheels turned as viewed from above with the superstructure of the trailer cut away, portions of the wheel mounting structures being shown in horizontal cross section.

Referring now more particularly to the drawings, there is shown a trailer having a body designated generally by reference numeral 2 having connected therewith eight separate wheel mounting structures each of which is designated by reference numeral 3. The wheel mounting structures are arranged in pairs, two pairs adjacent each end of the body 2. The pairs of wheel mounting structures adjacent each end of the body are spaced apart generally longitudinally of the body. The wheel mounting structures of each pair are spaced apart generally transversely of the body or in other words are in transverse alignment.

I have purposely not shown in the drawings the details of the wheel mounting structures 3 since except for the means for turning them presently to be described they may be conventional. For purposes of explanation and illustration each of the wheel mounting structures 3 may be considered to be of the well known "fifth wheel" type. It is sufficient for present purposes to say that each of the wheel mounting structures 3 underlies and is connected with the body 2 to turn relatively to the body about a generally vertical axis. In the form of structure shown in the drawings each wheel mounting structure 3 carries two wheels 4 although the number of wheels carried by each wheel mounting structure is not a limitation upon the invention. The eight wheel mounting structures collectively support the body 2 in conventional manner.

While as above stated the wheel mounting structures may be conventional, I have shown in a general way in the drawings one form in which the wheel mounting structure has a generally vertical post 5 operating in a sleeve 7.

Pivoted to the body 2 about a vertical pivot 8 at each end of the body is a tongue 9. Each tongue extends from its pivot 8 generally between the axes of opposed wheel mounting structures 3 at the corresponding end of the trailer and has its extremity projecting beyond that end of the body as shown at 10. Each of the tongues 9 has integral therewith a cross piece 11. The cross pieces 11 of the respective tongues 9 are interconnected by crossed links 12 so that when the tongue at one end of the trailer turns in a particular direction the tongue at the opposite end of the trailer will turn in the opposite direction and to the same extent. The remainder of the trailer steering mechanism is duplicated at the respective ends of the trailer and description thereof for one end of the trailer will suffice for both ends.

The tongue 9 has a portion 13 extending beyond the pivot 8 away from the end of the body at which the tongue is disposed. A link 14 is pivoted intermediate its ends at 15 to the inwardly projecting portion 13 of the tongue 9 and at its respective ends is pivotally connected at 16 with respective opposed wheel mounting structures 3 adjacent the end of the trailer at which the tongue is disposed whereby turning of the tongue causes turning of those wheel mounting structures.

Specifically in the form of trailer steering mechanism shown in the drawings each of the wheel mounting structures 3 adjacent the end of the trailer has a projection 17, the projections 17 extending in the same general direction as the projecting portion 13 of the tongue 9, and the pivotal connections 16 at the ends of the link 14 are connected with the projections 17 by the pivotal connecting means 16.

Likewise each of the wheel mounting structures 3 adjacent the end of the trailer has a generally laterally outward projection 18 and each of the wheel mounting structures 3 of the pair of wheel mounting structures next to the first mentioned wheel mounting structures also has a laterally outward projection 19. At each side of the trailer a link 20 is pivoted at 21 to the projection 18 and at 22 to the projection 19.

Consequently when either tongue or drawbar 9 is turned through a given angle in one direction all four of the wheel mounting structures 3 adjacent one end of the body are turned in one direction and all four wheel mounting structures 3 adjacent the opposite end of the body are turned in the opposite direction. The angle through which each wheel mounting structure turns upon predetermined angular movement of either tongue 9 may be determined by the position of the projections 17, 18 and 19 and the distance between the axis of turning movement of each wheel mounting structure and the pviotal connections 16, 21 and 22. I preferably proportion and position the respective elements so that upon turning of either tongue 9 through a predetermined angle the wheel mounting structures respectively turn through different angles but each to a position in which the extended wheel axle passes through a predetermined point; i. e., all of the extended wheel axles pass through the same point. The effect is movement of the trailer in a desired curved path with a minimum of sliding of the wheels so that a condition of approximate full rolling of each wheel upon th esupporting floor is attained while at the same time, as mentioned above, the trailer can be unprecedentedly low, short and narrow with an unprecedentedly small turning radius.

Each tongue 9 may carry at its extremity any suitable means whereby it may be coupled or otherwise attached to a suitable source of power whereby the trailer is moved and steered. Since the attaching mechanism forms no part of the present invention it will not be described in detail. It is sufficient for present purposes to say that means are shown for attaching the trailer to a conventional truck or tractor of the type commonly used for moving trailers of the type with which the invention is concerned.

While I have shown and described a present preferred embodiment of the invention it is to be distinctly understood that the invention is not limited thereto but may be otherwise variously embodied within the scope of the following claims.

I claim:

1. In a trailer having a body, two pairs of separate wheel mounting structures, the pairs being spaced apart generally longitudinally of the body but both pairs being adjacent the same end of the body, the wheel mounting structures of each pair being spaced apart generally transversely of the body, each of the wheel mounting structure being connected with the body for turning movement relatively to the body about a generally vertical axis, at least one wheel mounted in each of the wheel mounting structures and a tongue at an end of the body for moving the trailer, the tongue being pivotally connected with the body and having a portion extending beyond the pivot away from said end of the body, means directly connected to said portion of the tongue and with the wheel mounting structures of one of said pairs of wheel mounting structures and links, one at each side of the longitudinal center line of the trailer, extending directly between and directly connecting the two wheel mounting structures at that side, whereby turning of the tongue about its pivotal connection with the body turns all four wheel mounting structures, each of said links being disposed at the same side of the generally vertical axes of the two wheel mounting structures connected thereby.

2. In a trailer having a body, two pairs of separate wheel mounting structures, the pairs being spaced apart generally longitudinally of the body but both pairs being adjacent the same end of the body, the wheel mounting structures of each pair being spaced apart generally transversely of the body, each of the wheel mounting structures being connected with the body for turning movement relatively to the body about a generally vertical axis, at least one wheel mounted in each of the wheel mounting structures and a tongue at an end of the body for moving the trailer, the tongue being pivotally connected with the body and having a portion extending beyond the pivot away from said end of the body, each of the wheel mounting structures of one of said pairs of wheel mounting structures having a projection extending in the same general direction as said portion of the tongue, means directly connected to said portion of the tongue and with said respective projections, the two wheel mounting structures at each side of the longitudinal center line of the trailer having other projections extending generally in the same direction from their generally vertical axes, and links, one at each side of the longitudinal center line of the trailer, extending directly between and directly connecting the last mentioned projections of the two wheel mounting structures at that side, whereby turning of the tongue about its pivotal connection with the body turns all four wheel mounting structures.

3. In a trailer having a body, two pairs of separate wheel mounting structures, the pairs being spaced apart generally longitudinally of the body but both pairs being adjacent the same end of the body, the wheel mounting structures of each pair being spaced apart generally transversely of the body, each of the wheel mounting structures being connected with the body for turning movement relatively to the body about a generally vertical axis, at least one wheel mounted in each of the wheel mounting structures and a tongue at an end of the body for moving the trailer, the tongue being pivotally connected with the body and having a portion extending beyond the pivot away from said end of the body, each of the wheel mounting structures of the pair of wheel mounting structures nearer said end of the body having a projection extending in the same general direction as said portion of the tongue, means directly connected to said portion of the tongue and with said respective projections, the two wheel mounting structures at each side of the longitudinal center line of the trailer having other projections extending generally in the same direction from their generally vertical axes, and links, one at each side of the longitudinal center line of the trailer, extending directly between and directly connecting the last mentioned projections of the two wheel mounting structures at that side, whereby turning of the tongue about its pivotal connection with the body turns all four wheel mounting structures.

4. In a trailer having a body, four pairs of separate wheel mounting structures, two pairs adjacent each end of the body, the pairs adjacent each end of the body being spaced apart generally longitudinally of the body, the wheel mounting structures of each pair being spaced apart generally transversely of the body, each of the wheel mounting structures being connected with the body for turning movement relatively to the body about a generally vertical axis, at least one wheel mounted in each of the wheel mounting structures and tongues at the respective ends of the body for moving the trailer, each tongue being pivotally connected with the body and having a portion extending beyond the pivot away from the end of the body at which the tongue is disposed, each of the wheel mounting structures of one of the pairs of wheel mounting structures adjacent each end of the body having a projection extending in the same general direction as the aforementioned portion of the corresponding tongue, means directly connected to the aforementioned portion of each tongue and with said respective projections of said pair of wheel mounting structures adjacent the corresponding end of the body, the two wheel mounting structures at each side of the longitudinal center line of the trailer at each end of the body having other projections extending generally in the same direction from their generally vertical axes, links, one at each side of the longitudinal center line of the trailer adjacent each end of the body, extending directly between and directly connecting the last mentioned projections of the corresponding two wheel mounting structures and means connecting the respective tongues for operation in unison, whereby turning of either tongue about its pivotal connection with the body turns all eight wheel mounting structures.

5. In a trailer having a body, four pairs of separate wheel mounting structures, two pairs adjacent each end of the body, the pairs adjacent each end of the body being spaced apart generally longitudinally of the body, the wheel mounting structures of each pair being spaced apart generally transversely of the body, each of the wheel mounting structures being connected with the body for turning movement relatively to the body about a generally vertical axis, at least one wheel mounted in each of the wheel mounting structures and tongues at the respective ends of the body for moving the trailer, each tongue being pivotally connected with the body and having a portion extending beyond the pivot away from the end of the body at which the tongue is disposed, each of the wheel mounting structures of one of the pairs of wheel mounting structures adjacent each end of the body having a projection extending in the same general direction as the aforementioned portion of the corresponding tongue, means directly connected to the aforementioned portion of each tongue and with said respective projections of said pair of wheel mounting structures adjacent the corresponding end of the body, the two wheel mounting structures at each side of the longitudinal center line of the trailer at each end of the body having other projections extending generally in the same direction from their generally vertical axes, links, one at each side of the longitudinal center line of the trailer adjacent each end of the body, extending directly between and directly connecting the last mentioned projections of the corresponding two wheel mounting structures, each of the tongues having a cross piece fixed thereto and crossed links pivoted to the respective cross pieces so that turning of one tongue in one direction causes turning of the other tongue in the opposite direction, whereby turning of either tongue about its pivotal connection with the body turns all four wheel mounting structures adjacent one end of the body in one direction and all four wheel mounting structures adjacent the opposite end of the body in the opposite direction.

References Cited in the file of this patent

UNITED STATES PATENTS

| | | |
|---|---|---|
| 1,925,712 | Campbell | Sept. 5, 1933 |
| 2,431,626 | Townsend | Nov. 25, 1947 |
| 2,676,029 | Hutchinson | Apr. 20, 1954 |

FOREIGN PATENTS

| | | |
|---|---|---|
| 723,727 | Germany | Aug. 10, 1942 |
| 811,423 | Germany | Aug. 20, 1951 |